(No Model.)
2 Sheets—Sheet 1.
T. MAXON.
DISK HARROW.
No. 391,258. Patented Oct. 16, 1888.
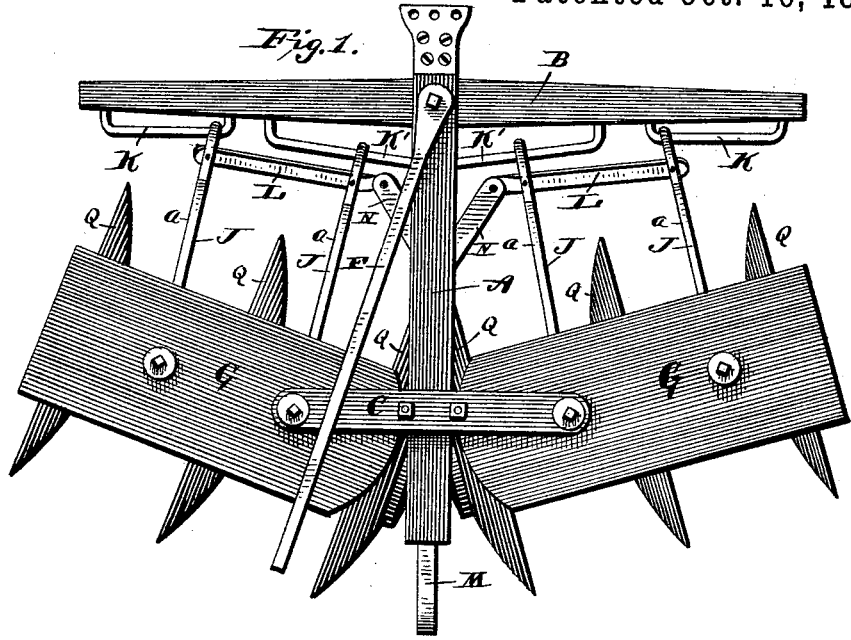
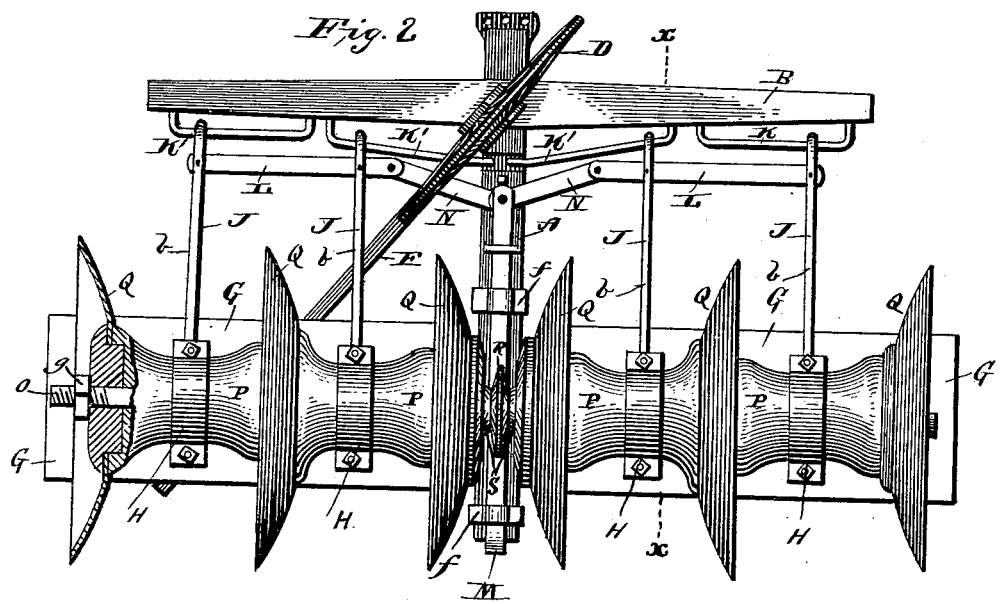
WITNESSES.
INVENTOR.
Thomas Maxon,
By C. M. Alexander,
Attorney.

(No Model.) 2 Sheets—Sheet 2.

T. MAXON.
DISK HARROW.

No. 391,258. Patented Oct. 16, 1888.

WITNESSES,

INVENTOR,
Thomas Maxon,
By C. M. Alexander,
Attorney.

UNITED STATES PATENT OFFICE.

THOMAS MAXON, OF DAYTON, OHIO.

DISK HARROW.

SPECIFICATION forming part of Letters Patent No. 391,258, dated October 16, 1888.

Application filed March 21, 1888. Serial No. 267,931. (No model.)

*To all whom it may concern:*

Be it known that I, THOMAS MAXON, a citizen of the United States, residing at Dayton, in the county of Montgomery and State of Ohio, have invented certain new and useful Improvements in Disk Harrows, of which the following is a specification, reference being had therein to the accompanying drawings.

My invention has relation to certain new and useful improvements in disk harrows or pulverizers; and it is designed, particularly, as an improvement on that class or character of machines wherein two or more gangs of concavo-convex disks are employed for pulverizing the soil, the gangs being usually arranged approximately in line with each other and adapted to be shifted to a position at an incline with the line of draft, the gangs being so connected together that their adjustment is mutual and simultaneous, as will be more fully hereinafter specified.

The invention has for its objects, essentially, to provide improved means for preventing the inner or adjacent ends of the disk-gangs from rubbing or abutting against each other when the machine is working on rough and irregular ground or when the gangs are adjusted to an acute angle with the line of draft; also, to provide improved means for shifting or adjusting the gangs and holding them in such adjusted position, as will fully hereinafter appear.

In order to enable others to fully understand my invention and construct the same, I will now proceed to describe it, reference being had to the accompanying drawings, in which—

Figure 3:
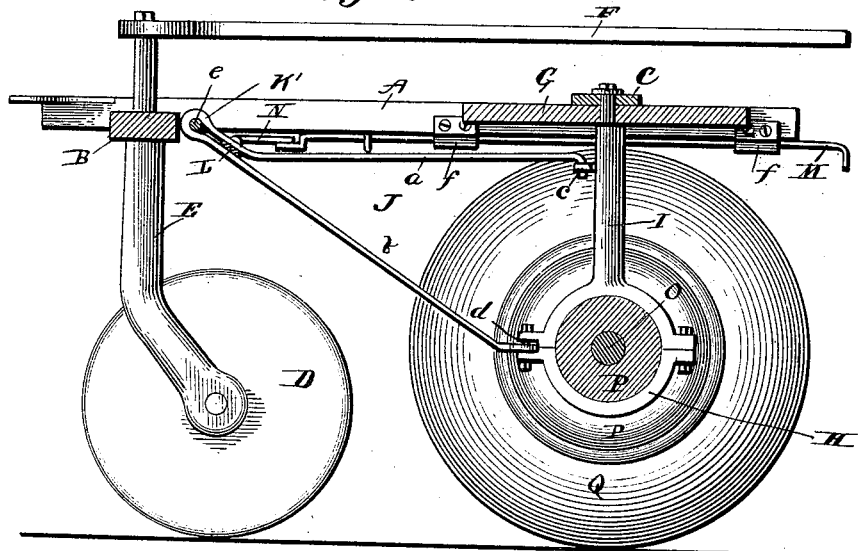
Figure 4:
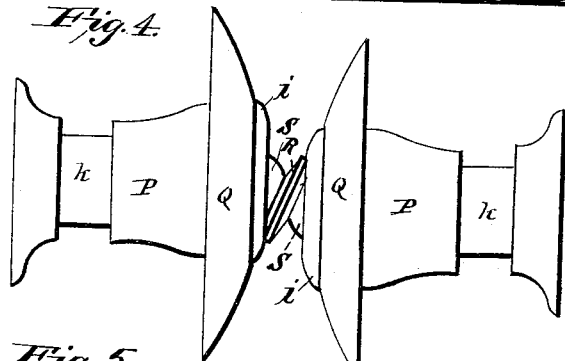
Figure 6:
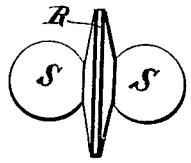
Figure 5:
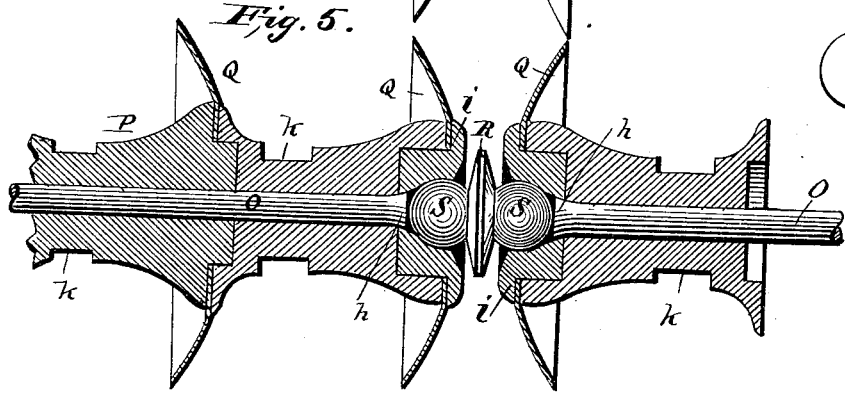

Figure 1 represents a plan view of the improved harrow complete, the gangs being adjusted to a position on an acute angle with the line of draft; Fig. 2, an inverted plan view of the same, the gangs being in a position at right angles to the line of draft; Fig. 3, a transverse sectional view taken on the line X X of Fig. 2; Fig. 4, a detail plan view of the adjacent or inner ends of the gangs; Fig. 5, a longitudinal sectional view of the same, and Fig. 6 a detail view of the device inserted between the inner ends of the gangs to keep them from riding on or rubbing against each other.

Referring to these drawings by letters, A designates the draft pole or tongue, of the usual construction; B, a cross-bar rigidly secured to the pole near its forward end, and C another cross-bar, somewhat shorter than B and secured rigidly to the pole near its rear end.

D designates a steering-wheel journaled in the lower bifurcated end of a vertical support or post, E, which passes vertically through the pole and is journaled therein, this post E being provided with a rearwardly-extending operating-handle, F. Pivotally attached at their inner ends to the projecting ends of the rear cross-bar, C, are two independent gang-beams, G, to which the respective gangs are attached. The gangs are journaled in two-part bearings or boxes H, from the upper halves of which rise vertical supporting-posts I, these posts I being attached securely to the under side of the beams G G. The gangs are journaled loosely in the boxes and are free to revolve independently of each other, as is evident. The vertical posts I are firmly braced against undue forward or backward movements by means of the forwardly-extending angular braces J, each one of which is pivotally attached at its rear end to one of the said posts. These braces J each consist of a horizontal arm, *a*, and a diagonal arm, *b*, the former being pivotally attached to one of the posts I at *c*, and the latter being pivotally attached at *d* to the journal-box H of the same post. The forward ends of these arms are formed into eyes *e*, through which pass horizontal guide-rods K K', secured rigidly to the rear side of the front cross-beam, B, the braces being by this means securely attached to the rods K, but having a free lateral movement thereon. Connecting the forward ends of these angular braces I are the bars L, whereby when one brace moves the other one will move correspondingly.

Attached to the under side of the pole is a rearwardly-extending shifting bar, M, this bar being adapted to reciprocate freely in guides *f*, secured to the pole. The forward end of this shifting bar is attached to the inner ends of the connecting-bars L by means of pivoted links N. It will be obvious that by means of the shifting bar and connecting-bars and links the gangs, being pivoted to the rear cross-beam, may be adjusted in any position desired, the movements of the gangs being always mutual and simultaneous.

The gangs are constructed alike, and consist each of a long metallic rod or bolt, O, provided with screw-threads on its outer end, on which is placed a tightening-nut, g, and on its inner end has formed on it a head, h. The collars or spools P, which support the pulverizing-disks Q, are all mounted or strung on these horizontal rods O, and are securely held thereon by means of the tightening-nuts g on the outer ends of the rods. The heads formed on the inner end of these rods O are countersunk in the innermost collars i, so as to be out of the way.

It will be evident that by thus constructing the gangs the disks may be readily removed when worn and replaced by new ones, and also that the disks are securely clamped between the collars without the aid of screws or bolts. It will also be observed that the collars are provided with annular grooves k, in which fit the journal-boxes H on the lower ends of the posts I.

The letter R designates a disk, preferably slightly beveled, this disk having formed on or attached to the center of its opposite sides spherical enlargements or balls S, which are adapted to rest and fit snugly in concave depressions formed in the inner ends of the gangs when the disk is interposed between them. This disk, with its enlargements, may be easily removed from between the gangs whenever desired. By means of this interposed disk the adjacent ends of the gangs will be effectually prevented from abutting or rubbing against each other when the gangs are adjusted on an incline to the pole, as shown in Fig. 1, or when they are working on uneven ground, as shown in Fig. 4. It will be perceived, also, that as the disk is perfectly free to revolve independently of the gangs, and as the enlargements fit in rounded recesses, the friction caused by the opposing gangs, no matter what position they may be in, will be greatly lessened.

Having thus fully described my invention, what I claim as new, and desire to secure by Letters Patent, is—

1. The combination, with the gangs provided with recesses in their adjacent ends, of the independent disk R, provided with enlargements on its opposite sides, the said enlargements being adapted to rest in the said recesses in the adjacent ends of the gangs, substantially as described.

2. The combination, with the gangs having concave depressions in their adjacent or inner ends, of the independent disk R, inserted between the said gangs and provided with spherical enlargements or balls S upon its opposite sides, these balls being adapted to fit and turn in the concave depressions in the adjacent ends of the gangs, substantially as described.

3. The combination of the pole, the cross-beams attached thereto, the guide-bars K K', attached to the front cross-beam, the gang-beams G, pivotally attached to the rear cross-beams, the posts I, attached to the beams G and provided at their lower ends with journal-boxes H, the two gangs journaled in these boxes, the angular braces J, pivotally attached at the rear ends to the said posts I, the forward ends of these braces embracing the said guide-rods K K' and adapted to move laterally thereon, the connecting-bars L, and the shifting bar connected to the inner ends of the bars L by means of pivoted links, all arranged as and for the purpose specified.

In testimony whereof I affix my signature in presence of two witnesses.

THOMAS MAXON.

Witnesses:
JULIA PAGENSTECHER,
JOHN L. H. FRANK.